United States Patent [19]

Yamoto et al.

[11] Patent Number: 4,911,216
[45] Date of Patent: Mar. 27, 1990

[54] MULTIPART WHEEL

[75] Inventors: Hisayoshi Yamoto, Yamato; Masakazu Ohi, Ayase, both of Japan

[73] Assignee: Topy Kogyo Kabushiki Kaisha, Tokyo, Japan

[21] Appl. No.: 215,291

[22] Filed: Jul. 5, 1988

[30] Foreign Application Priority Data

Apr. 21, 1986 [JP] Japan .................................. 61-91894

[51] Int. Cl.⁴ ............................................. B60B 25/04
[52] U.S. Cl. .................................... 152/410; 152/409
[58] Field of Search ............... 152/409, 410, 396, 402, 152/405, 406, DIG. 10, DIG. 17; 301/35 SL

[56] References Cited

U.S. PATENT DOCUMENTS

| | | | |
|---|---|---|---|
| 2,827,100 | 3/1958 | Herzegh | 152/410 |
| 2,992,045 | 7/1961 | Martinet | 152/410 X |
| 3,623,530 | 11/1971 | Beyers et al. | 152/410 |
| 3,783,927 | 1/1974 | Verdier | 152/409 |
| 4,173,992 | 11/1979 | Lejeune | 152/410 X |
| 4,175,606 | 11/1979 | Bailey | 152/410 X |
| 4,438,797 | 3/1984 | Suckow | 152/410 |
| 4,453,583 | 6/1984 | Smith | 152/410 |
| 4,554,961 | 11/1985 | Osawa et al. | 152/410 |

FOREIGN PATENT DOCUMENTS

| | | | |
|---|---|---|---|
| 1117321 | 5/1956 | France | 152/DIG. 10 |
| 46-18643 | 5/1971 | Japan . | |
| 0247902 | 10/1987 | Japan | 152/409 |

Primary Examiner—Russell D. Stormer
Attorney, Agent, or Firm—Cushman, Darby & Cushman

[57] ABSTRACT

A composite wheel for a vehicle including a disk, a rim having a rim base portion, a bead seat band mounted about the rim base portion, a side ring mounted on the bead seat band, and a lock ring provided between the rim base portion and the bead seat band for locking the bead seat band on the rim. An angle of a contact surface formed between the bead seat band and the lock ring is between 30° and 40° relative to an axis of the wheel so that slip at the contact surface between the bead seat band and the lock ring due to a load from a tire can be effectively prevented, while the sufficiency of the strength of each member in the wheel can be ensured.

5 Claims, 4 Drawing Sheets

MULTIPART WHEEL

BACKGROUND OF THE INVENTION

1. Field of the Invention

The present invention relates to a composite wheel for a vehicle and, in particular, to a composite wheel wherein a bead seat band, a side ring holding a tire, and a lock ring fixing the bead seat band are provided around a periphery of a rim.

2. Description of the Prior Art

Various structures of a composite wheel for a vehicle have been proposed. For example, JP-B-46-18643 discloses a typical structure of composite wheel. FIG. 7 illustrates a part of the composite wheel disclosed in that patent publication.

Referring to FIG. 7, rim 1 is connected to disk 2 and one end portion of the rim in the axial direction of the wheel is formed as a rim base portion 3. Bead seat band 5 is mounted about the periphery of rim base portion 3 and an O ring 4 is disposed therebetween. Bead seat band 5 is fixed on rim base portion 3 by lock ring 11 via contact surface 10 formed between the bead seat band and the lock ring. A side ring 7 engages flange portion 6 of bead seat band 5 and one of the bead portions 9 of tire 8 is held by the periphery of bead seat band 5 and the inside surface of side ring 7.

As illustrated in FIG. 7, in the conventional composite wheel, an angle K defined between the contact surface 10 and an axis of wheel is about 45° in almost all cases. The reason for setting the angle K to 45° is presumably because a 45° angle would theoretically be the best for performing the necessary functions of preventing bead seat band 5 from moving in the axial direction of the wheel when the tire 8 expands, ensuring the strength of the bead seat band, ensuring the positioning accuracy of the bead seat band on rim base portion 3 in the axial direction of the wheel, and ensuring the strength of lock ring 11.

Applicants have found however, that an angle K of 45° is not always the best for proper wheel performance when it receives the load from the tire, and in fact there may be some problems depending on the angle.

With the structure shown in FIG. 7, the following problems can be supposed. Here, the following symbols are used:

W1; a load due essentially to the air pressure of tire 8 from the tire toward side ring 7, W2; a load due essentially to the vertical load of tire 8 from the tire toward bead seat band 5, F; a frictional force at contact surface 10 between bead seat band 5 and lock ring 11 generated by the load W1, f; a force slipping bead seat band 5 generated by the load W2, $\mu$; a friction coefficient on contact surface 10.

The forces F and f are expressed as follows. Since bead seat band 5 has a ring structure, an wedge effect acts between the bead seat band and lock ring 11. The frictional force F due to the load W1 generated by the air pressure of tire 8 is expressed as:

$$F = \mu \cdot W1/\sin K \quad (1)$$

The force f slipping bead seat band 5 due to the load W2 is expressed as:

$$f = W2 \cdot \sin K \quad (2)$$

Now, problems in actual use are considered. If the load W2 exceeds a certain limit value by an increase in the vertical load of tire 8, the force f becomes greater than the force F, thereby causing a slip between bead seat band 5 and lock ring 11 at contact surface 10. Namely, where the slope angle of contact surface 10 is 45°, when the load from tire 8 increases, bead seat band 5 slips on lock ring 11 in the direction of arrow A shown in FIG. 7. When the slip occurs, gap B between rim base portion 3 and bead seat band 5, which is located on the side of the load from tire 8, decreases. At the same time, because bead seat band 5 is a ring-shaped structure, the gap B increases on the opposite side of the rim/bead seat band structure. The increase of gap B causes the sealing force of O ring 4 to decrease, whereby a leakage of air from tire 8 is likely to occur. In addition, where the slip occurs, the contact state on contact surface 10 changes from a surface contact to a line contact, and, accordingly, a frictional force on the contact surface in the circumferential direction of the wheel greatly decreases. As a result, in accordance with a torque transmission between tire 8 and disk 2, a condition of slip is satisfied at the portion of contact surface 10.

If slip in the circumferential direction occurs, bead seat band 5 moves on rim base portion 3 in the circumferential direction, particularly where a large torque is generated by the acceleration or braking of the vehicle. Such a movement is likely to cause a locking key provided for preventing such a mutual whirl to break. In a tube type tire, then, the tube will be pulled in the circumferential direction and will crack, thereby causing leakage of air from the tire. Similarly, in a tubeless type tire, since the interference of O ring 4 becomes nonuniform in the circumferential direction, a leakage of air from the tire is also likely to occur.

SUMMARY OF THE INVENTION

It is an object of the present invention to provide a composite wheel structure which can reliably prevent a bead seat band from slipping by increasing an acceptable value of a vertical load from a tire in accordance with occurance of a slip of the bead seat band, while ensuring the strength and positioning accuracy of the bead seat band and the strength of a lock ring which is to be inserted into a limited space between a rim and the bead seat band.

As noted above, where an angle of a contact surface between a lock ring and a bead seat band is 45°, a slippage on the contact surface occurs when force f is equal to or greater than force F. Since the condition that allows the slip is $f \geq F$, the following equation can be derived from the aforementioned equations (1) and (2).

$$W2 \sin K \geq \mu W1/\sin K \quad (3)$$

Since the angle of the contact surface is in the range of 0°–90° from the structure of the lock ring, the condition of $\sin K > 0$ is satisfied. Accordingly, the equation (3) can be reformed as follows.

$$W2 \geq \mu W1/(\sin K)^2 \quad (4)$$

From the equation (4), the smaller the value of $(\sin K)^2$ becomes, the larger the acceptable value of W2 capable of preventing the slip becomes. Thus, the smaller the angle K of the contact surface becomes, the less likely slip on the contact surface will be.

However, i angle K is too small, since the wedge effect on the contact surface becomes too strong and the loads applied on the bead seat band and the rim base portion in the radial direction thereof become too great, too small an angle is not desirable from a stand point of strength. In addition, when the angle K is too small, the positioning accuracy of the bead seat band in the axial direction of the wheel depending on locking of the lock ring will be decreased. Further, since the lock ring is inserted into a limited space between the bead seat band and the rim base portion, when the angle K is too small, the thickness of the lock ring in the radial direction is too small and sufficient strength of the lock ring can not be ensured.

When the angle K of the contact surface is larger than 40°, however, it is difficult to prevent a slip between the bead seat band and the lock ring, as was the case with the conventional wheel shown in FIG. 7. On the other hand, when the angle is smaller than 30°, it becomes difficult to obtain a sufficient strength of the rim and to ensure that the thickness of the lock ring will be large enough. With the angle K in the range of $30° \leq K \leq 40°$, then, while the load W2 can be increased without experiencing slip, the sufficiency of the strength of each portion of the wheel can be ensured.

Accordingly the composite wheel according to the present invention comprises:

a disk;

a rim connected to the disk, one end portion of the rim in an axial direction of the wheel being formed as a rim base portion, the rim having a groove defined on a peripheral surface of the rim base portion, the groove extending in a circumferential direction of the rim over the entire length of the rim;

a bead seat band attached around the periphery of the rim base portion via an 0 ring, the bead seat band holding a bead portion of a tire from an inside of the bead portion in a radial direction of the tire, and outer end portion of the bead seat band in the axial direction of the wheel being formed as a flange portion, the flange portion having a sloped radially inner wall portion in facing relation to an outer side of said wheel in the axial direction of the wheel;

a side ring engaging an axially inner surface of the flange portion of the bead seat band, the side ring holding the bead portion of the tire from an axially outer side of the bead portion; and a lock ring provided between the rim base portion and the flange portion of the bead seat band for locking bead seat band on the rim, the lock ring extending in the circumferential direction of the rim, the lock ring having a portion to be inserted into the groove and a engaging surface constituting a contact surface with an angle of between about 30° and about 40° relative to an axis of the wheel between the lock ring and the bead seat band in cooperation with the sloped wall portion of the flange portion.

BRIEF DESCRIPTION OF THE DRAWINGS

The above and other objects, features and advantages of the present invention will be become apparent and can be more readily appreciated from the following detailed description of the preferred exemplary embodiments of the invention, taken in conjunction with the accompanying drawings which are given by way of example only, and thus are not intended to limit the present invention, and in which.

DETAILED DESCRIPTION OF THE PREFERRED EMBODIMENTS

Figure 1:
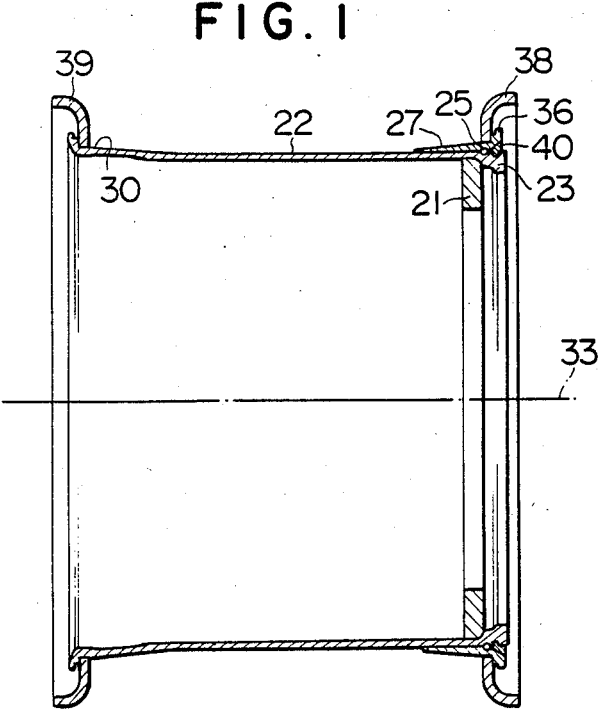
FIG. 1 is a vertical sectional view of a composite wheel according to an embodiment of the preset invention.
Figure 2:
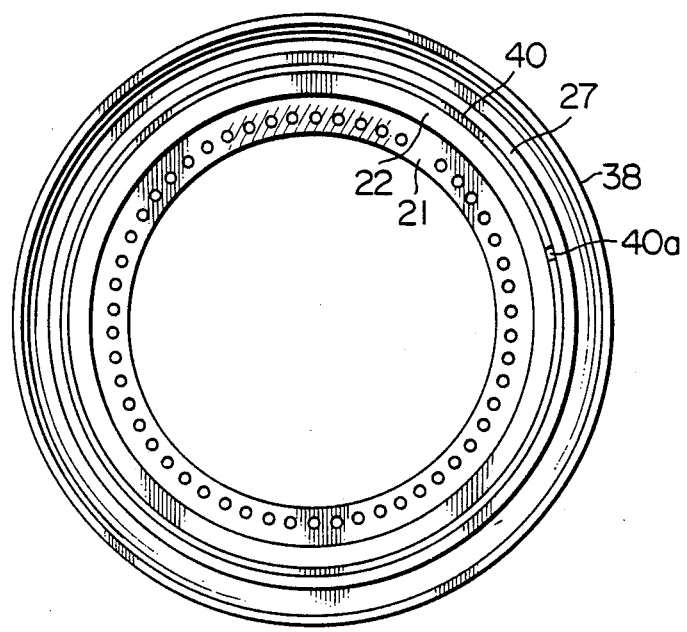
FIG. 2 is a side view of the wheel shown in FIG. 1.

The preferred embodiments of the present invention will be described hereafter with reference to the attached drawings.

FIGS. 1-4 illustrate a composite wheel for a vehicle according to an embodiment of the present invention. A rim 22 is connected to the periphery of a disk 21 by welding, etc. One of the end portions of the rim 22 is formed as a rim base portion 23. A groove 24 is defined on the periphery of the rim base portion 23 and extends circumferentially over the entire length of the rim 22.

A bead seat band 27 is mounted about the periphery of the rim base portion 23 via 0 ring 25 disposed in a groove 26. The bead seat band 27 holds one bead portion 29a of bead portions 29 of a tire 28 from radially inside the bead portion. The other bead portion 29b is held by a bead seat portion 30 formed on the other end portion of the rim 22. An axially outer end portion of bead seat band 27 is formed as a flange portion 36. The flange portion 36 has a sloped radially inner wall portion 37 in facing relation to an axially outer side of the wheel.

In this embodiment, tire 28 is a tube type tire having a tube 31. A flap 32 is provided between the inside surface of the tube 31 in the axial direction thereof and peripherally of the ri 22. Rim 22 has a hole 35 for receiving a valve 34 at a central position of the rim in the axial direction of the wheel.

A side ring 38 is provided on the bead seat band 27. The side ring 38 engages the axially inner surface of the flange portion 36 of the bead seat band 27. Side ring 38 holds the bead portion 29a of the tire 28 from the axially outer side of the bead portion. Another side ring 39 is provided on the other end portion of the rim. The side ring 39 similarly holds the other bead portion 29b of the tire 28. The side rings 38 and 39 are identical in thickness.

A lock ring 40 is provided between the flange portion 36 of the bead seat band 27 and the rim base portion 23. Lock ring 40 locks the bead seat band on the rim 22. The lock ring 40 extends in the circumferential direction of the rim 22 along the periphery of the rim base portion 23 and has a slit 40a at an appropiate position in the circumferential direction. The lock ring 40 is inserted and attached in the above-noted position after being radially expanded. The lock ring 40 ha a portion 41 for insertion into the groove 24 and an engaging surface 43 constituting a contact surface 42 between the lock ring and the sloped wall 37 of bead seat band 27. Thus, the engaging surface 43 and the sloped wall 37 have substantially the same inclined angle. In the illustrated embodiment, angle K of the engaging surface 43 and the sloped wall 37 is 35° relative to an axis 33 of the wheel.

The material of lock ring 40 is preferably harder than the material of bead seat band 27. For example, when SS41 is used as the material of bead seat band 27, S30C or S35C is preferably selected as the material of lock ring 40. In the alternative, S25C, S40C or S45C may be selected.

Figure 4:
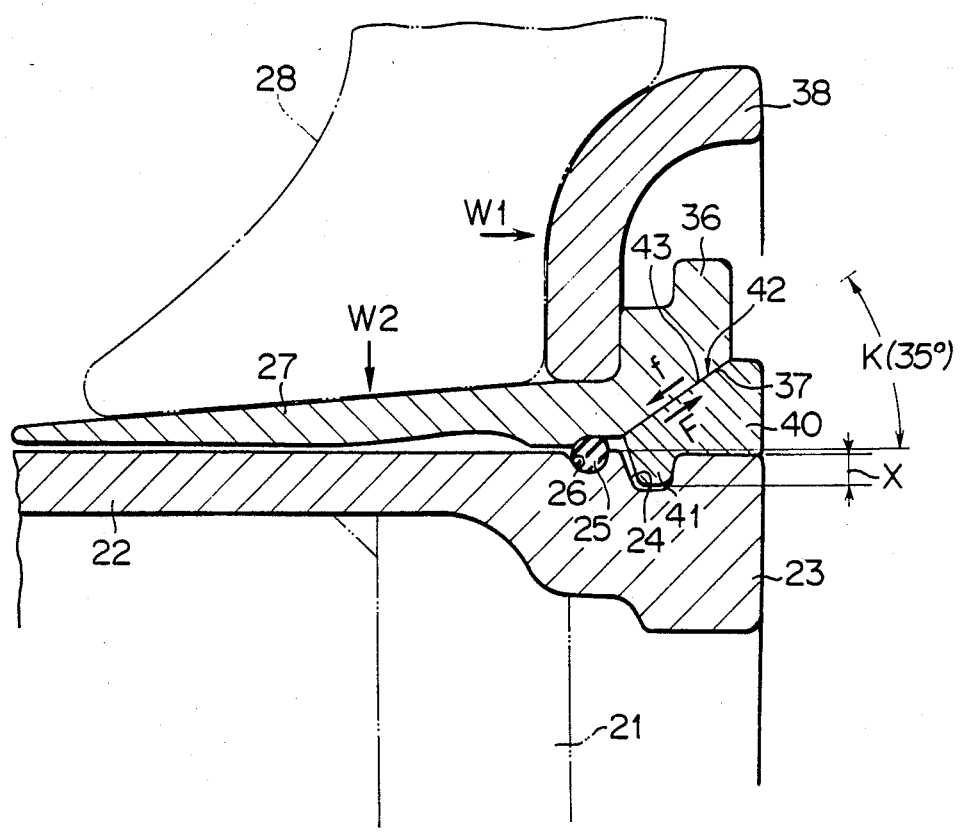
FIG. 4 is an enlarged partial sectional view of the wheel shown in FIG. 3

The depth of groove 24 is identified by X in FIG. 4. The depth X is set so as to ensure both the strength of lock ring 40 and the strength of rim base portion 23. More particularly, in order to ensure that the strength of the lock ring 40 is adequate and that the holding strength of the rim base portion 23 is sufficient for holding the lock ring in a desirable state, the depth X must be more than 4–5 mm.

Figure 3:
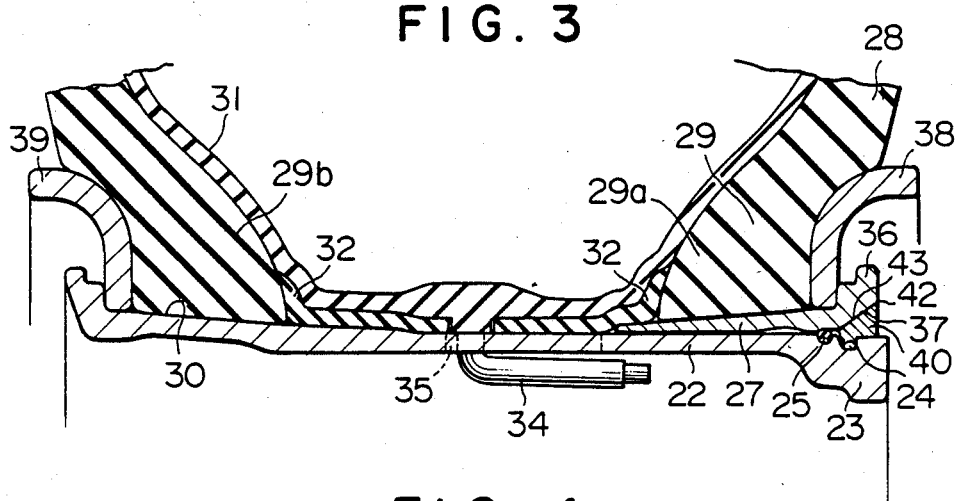
FIG. 3 is an enlarged partial sectional view of the wheel shown in FIG. 1 with a tube type ire attached thereto.
Figure 5:
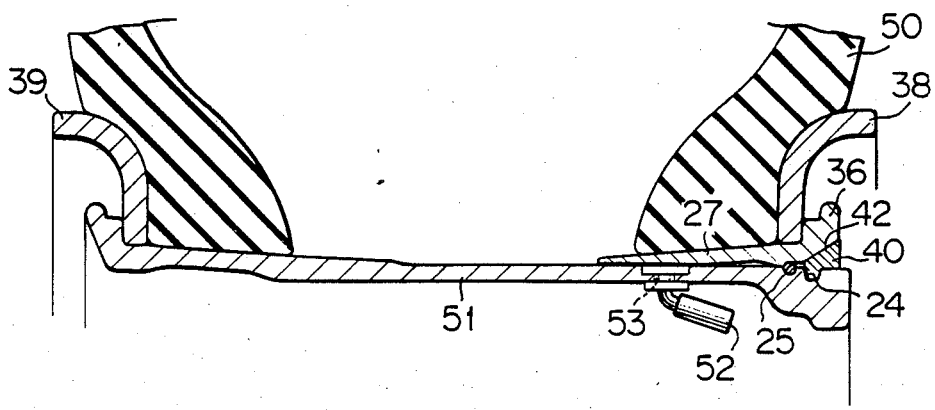
FIG. 5 is a partial sectional view of a composite wheel, with a tubeless type tire attached thereto, according to another embodiment of the present invention.

FIG. 5 shows a composite wheel for a tubeless type tire 50 according to another embodiment of the present invention. A hole 53 is defined in a rim 51 at a position axially inward of 0 ring 25 and a valve 52 is inserted into the hole. Other portions in the wheel shown in FIG. 5 are substantially the same as the portions shown in the structure of in FIG. 3, so the same reference numerals as in FIG. 3 are given to the corresponding portions in FIG. 5.

Figure 6:
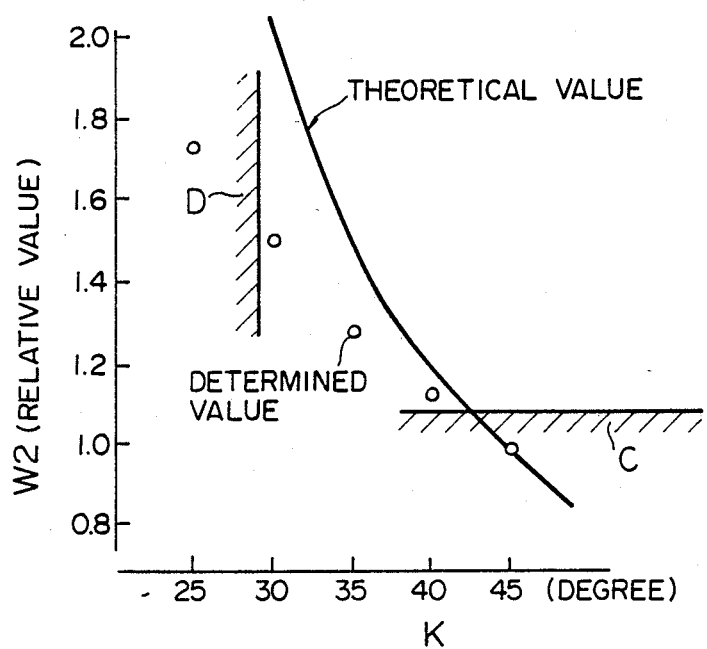
FIG. 6 is a graph showing the relationship between an angle K of a contact surface and a vertical load W2 applied from a tire.
Figure 7:
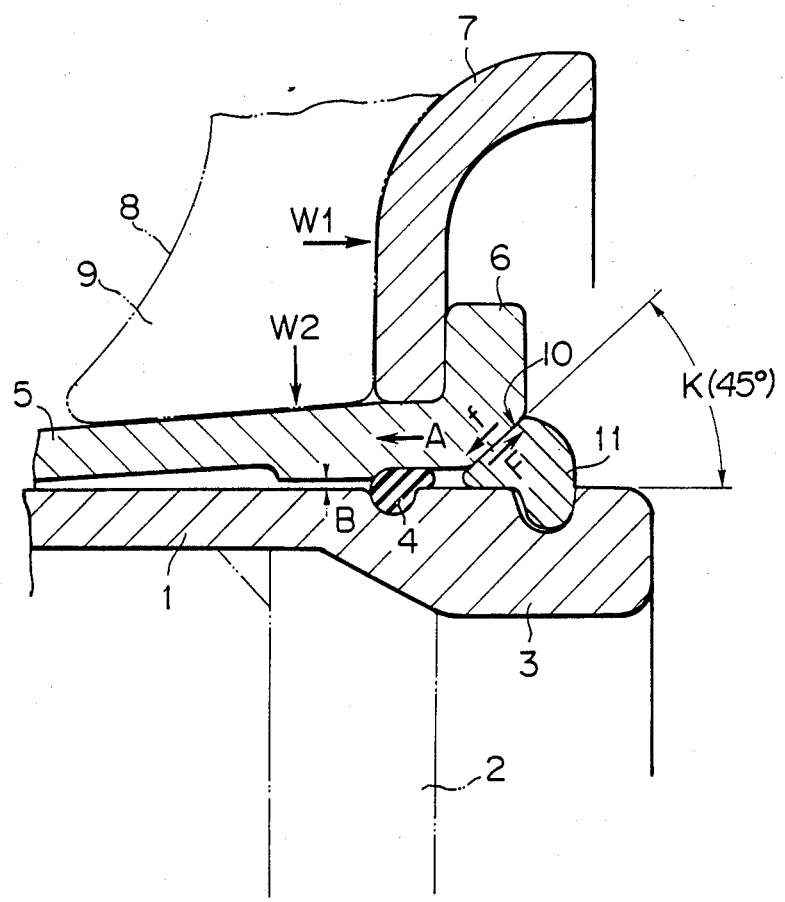
FIG. 7 is a partial sectional view of the conventional composite wheel.

In the above embodiments, a lateral load W1 acts from tire 28(50) to side ring 38 and a vertical load W2 acts from the tire to bead seat band 27, respectively, as shown in FIG. 4. As noted above, a frictional force F due to the load W1 and a slipping force f due to the load W2 are generated on contact surface 42 between bead seat band 27 and lock ring 40. The acceptable load W2 for satisfying $f \leq F$, that is, for preventing a slip on the contact surface 42, can be increased by setting the angle K to 30°–40° as shown in FIG. 6. In FIG. 6, W2 is expressed as a relative value where the load W2 is 1.0 when the angle K is 45°. Although the values determined in this test are smaller than the theoretical values, this difference is believed to be the result of the influence of surface roughness of sloped wall 37 and engaging surface 43, etc.

Since the angle K in the illustrated embodiment is 35°, the acceptable load W2 increases by about 30% as compared to the load in the conventional wheel, where the angle is 45°. Area C shown in FIG. 6 indicates an area wherein an improvement in the prevention of slip can not be obtained. The acceptable load W2 must be greater than the area C to obtain a remarkable effect on contact surface 42. Thus, the angle K must not be greater than 40°.

On the other hand, area D shown in FIG. 6 indicates an undesirable area from the viewpoint that the wedge effect of bead seat band 27 to lock ring 40 becomes too strong and the load applied to the lock ring and rim base portion 23 becomes too large. In addition, when the angle K is too small, the positioning accuracy of bead seat band 27 due to lock ring 40 in the axial direction of the wheel decreases. Further, since lock ring 40 is inserted to the limited space between bead seat band 27 and rim base portion 23, if the angle K is too small, the thickness of the lock ring in the radial direction becomes too small add the necessary strength of the lock ring can not be maintained. Accordingly, K should be greater than or equal to 30°.

Where $30° \leq = K \leq 40°$, a slip between lock ring 40 and bead seat band 27 can be sufficiently prevented while the strengths of the bead seat band, the lock ring and rim base portion 23 are respectively ensured. By preventing a slip on contact surface 42, displacement of bead seat band 27 on rim 22 in both the axial direction and the circumferencial direction can be prevented and the generation of problems such as air leakage etc. can be prevented both with a tube type tire and a tubeless type tire.

Moreover, since a mutual slipping does not occur between lock ring 40 and bead seat band 27, abrasion of the lock ring and/or the bead seat band can be prevented. Where the material of lock ring 40 is harder than the material of bead seat band 27, abrasion of the lock ring can be even more easily prevented.

Furthermore, although good results are obtained with angle K in the range of 30°-40°, if the range is set to $32° \leq K \leq 38°$ in consideration of manufacturing error or surface roughness of each member, or a shock load from a tire, even more effective and complete prevention of slip can be ensured.

Although several preferred embodiments of the present invention have been described in detail, it will be appreciated by those skilled in the art that various modifications and alterations can be made to the particular embodiments shown without materially departing form the novel teachings and advantages of this invention. Accordingly, it is to be understood that all such modifications and alterations are included within the scope of the invention as defined by the following claims.

What is claimed is:

1. A composite wheel comprising:
   a disk;
   a rim connected to said disk, one end portion of said rim in an axial direction of said wheel being formed as a rim base position, said rim having a groove defined on a peripheral surface of said rim base portion, said groove extending in a circumferential direction of said rim over the entire length of said rim;
   a bead seat band attached around said periphery of said rim base portion, an O ring being mounted between said bead seat band and said rim base portion, said bead seat band holding a bead portion of a tire from an inside of said bead portion in a radial direction of said tire, an outer end portion of said bead seat band in the axial direction of said wheel being formed as a flange portion, said flange portion having a sloped radially inner wall portion in facing relation to an outer side of said wheel in the axial direction of said wheel;
   a side ring engaging an axially inner surface of said flange portion of said bead seat band, said side ring holding said bead portion of said tire from an axially outer side of said bead portion; and
   a lock ring provided between said rim base portion and said flange portion of said bead seat band for locking said bead seat band on said rim, said lock ring extending in the circumferential direction of said rim, said locking ring having a portion to be inserted into said groove and an engaging surface constituting a contact surface, with an angle of greater than 32° and less than about 40° relative to an axis of said wheel, between said lock ring and said bead seat band and in contact with said sloped wall portion.

2. The wheel of claim 1, wherein said contact surface between said lock ring and said bead seat band has an angle of about 35° relative to said axis of said wheel.

3. The wheel of claim 1, wherein said lock ring is formed from a material which is harder than a material of said bead seat band.

4. The wheel of claim 1, wherein said tire is a tube type tire.

5. The wheel of claim 1, wherein said tire is a tubeless type tire.

* * * * *